United States Patent
Mori et al.

(10) Patent No.: US 9,078,011 B2
(45) Date of Patent: Jul. 7, 2015

(54) VARIABLE AVAILABLE VIEWING TIME COMMUNICATION DEVICE AND SYSTEM

(71) Applicant: Panasonic Intellectual Property Management Co., Ltd., Osaka-shi, Osaka (JP)

(72) Inventors: Keiji Mori, Osaka (JP); Tatsuhiko Ikeda, Kyoto (JP); Masaaki Higashida, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/156,465

(22) Filed: Jan. 16, 2014

(65) Prior Publication Data

US 2014/0208371 A1     Jul. 24, 2014

(30) Foreign Application Priority Data

Jan. 18, 2013  (JP) .................................. 2013-007730
Dec. 25, 2013  (JP) .................................. 2013-266468

(51) Int. Cl.
| | |
|---|---|
| H04N 7/18 | (2006.01) |
| H04N 21/214 | (2011.01) |
| H04N 21/262 | (2011.01) |
| H04N 21/472 | (2011.01) |
| H04N 21/488 | (2011.01) |
| H04N 7/173 | (2011.01) |
| H04N 7/16 | (2011.01) |
| H04N 5/76 | (2006.01) |

(52) U.S. Cl.
CPC ......... *H04N 21/2146* (2013.01); *H04N 21/262* (2013.01); *H04N 21/47217* (2013.01); *H04N 21/4882* (2013.01)

(58) Field of Classification Search
CPC .................. H04N 21/2146; H04N 21/41422; H04N 21/47217; H04N 21/4882; H04N 21/262
USPC ......... 725/76, 77, 85, 97, 100, 131, 139, 151; 386/292, 294

See application file for complete search history.

(56) References Cited

U.S. PATENT DOCUMENTS

| | | | | |
|---|---|---|---|---|
| 6,738,372 | B1 * | 5/2004 | Morioka et al. | ............... 370/352 |
| 7,814,515 | B2 * | 10/2010 | Ohyama et al. | ................. 725/75 |
| 2010/0262509 | A1 * | 10/2010 | Delia et al. | ...................... 705/26 |

FOREIGN PATENT DOCUMENTS

| | | |
|---|---|---|
| JP | 2006-295753 A | 10/2006 |
| JP | 2011-205486 A | 10/2011 |

* cited by examiner

*Primary Examiner* — Hoang-Vu A Nguyen-Ba
(74) *Attorney, Agent, or Firm* — Shinjyu Global IP (57) ABSTRACT

The communication device is installed in a predetermined space. The communication device receives and displays content distributed only within a variable available viewing time. The communication device includes an available viewing time calculation unit configured to calculate the available viewing time, a replay time calculation unit configured to calculate the replay time needed to replay predetermined content, a warning determination unit configured to compare the replay time and the available viewing time and generate warning information when the replay time exceeds the available viewing time, and a display unit configured to display the warning information generated by the warning determination unit.

13 Claims, 6 Drawing Sheets

VARIABLE AVAILABLE VIEWING TIME COMMUNICATION DEVICE AND SYSTEM

PRIORITY

This application claims priority to Japanese Patent Applications No. 2013-007730 filed on Jan. 18, 2013 and Japanese Patent Application No. 2013-266468 filed on Dec. 25, 2013. The entire disclosure of Japanese Patent Application 2013-007730 and Japanese Patent Application No. 2013-266468 are hereby incorporated herein by reference.

BACKGROUND

1. Technical Field

This disclosure relates to a communication device and a communication system for replaying content.

2. Background Art

In conventional communication service, a server device storing audio visual (AV) content may be mounted on, for example, an airplane, and transmit content including video data or audio data (including movies, television programs, and music) to a terminal installed on each passenger seat on demand from each individual passenger. Such content distribution service particularly on an airplane or another vehicle allows passengers to view content only within a limited period of time (for an airplane, a period of time before preparations for landing) and passengers are unable to view the content after the limited period of time. The passengers who start viewing content may often need to stop it in the middle of the content.

To improve the situations, a data transmission and reception system has been developed to determine the replay speed for content based on the available time for content viewing and the remaining replay time of the content, and process the distributed data in accordance with the determined replay speed, and allow the processed content to be viewable within the available viewing time (see, for example, Japanese Unexamined Patent Publication No. 2011-205486).

SUMMARY

Technical Problem

However, passengers may want to start viewing content knowing that the content would not be viewable to the end. Further, the content may include parts that some viewers may want to skip, such as the first scene, and parts that some viewers may want to take time and enjoy, such as the climax scene. It is thus preferable that passengers can choose whether to view content.

This disclosure provides a communication device and a communication system that allow a viewer to determine whether to continue viewing content.

Solution to Problem

One aspect of the disclosure provides a communication device installed in a predetermined space. The communication device is operable to receive content distributed only within a variable available viewing time and display the content. The communication device includes an available viewing time calculation unit configured to calculate an available viewing time, a replay time calculation unit configured to calculate a replay time needed to replay predetermined content, a warning determination unit configured to compare the replay time and the available viewing time and configured to generate warning information when the replay time exceeds the available viewing time, and an output unit configured to output the warning information generated by the warning determination unit.

Another aspect of the disclosure provides a communication device installed in a predetermined space. The communication device is operable to distribute content to one other communication device only within a variable available viewing time. The communication device of this aspect of the disclosure includes an available viewing time calculation unit configured to calculate an available viewing time, a replay time calculation unit configured to calculate a replay time needed to replay predetermined content, and a warning determination unit configured to compare the replay time and the available viewing time and generate warning information when the replay time exceeds the available viewing time. The generated warning information is outputted to and displayed by the one other communication device.

The communication system and the communication device of the disclosure allow a user to easily determine whether to continue viewing the content.

DETAILED DESCRIPTION

Embodiments will now be described with reference to the drawings. Excessive details may be omitted. To avoid redundancy and help easy understanding for those skilled in the art, features known in the art may not be described in detail and substantially the same components may not be described in duplicate.

The attached drawings and description provided by the inventors are intended for those skilled in the art to fully understand the disclosure, and shall not limit the subject matter claimed.

The same letters, symbols, and numerals refer to the same elements unless otherwise specified. Elements that are not essential to the invention are not shown unless otherwise specified.

EMBODIMENTS

1-1. Structure of Communication System

Figure 1:
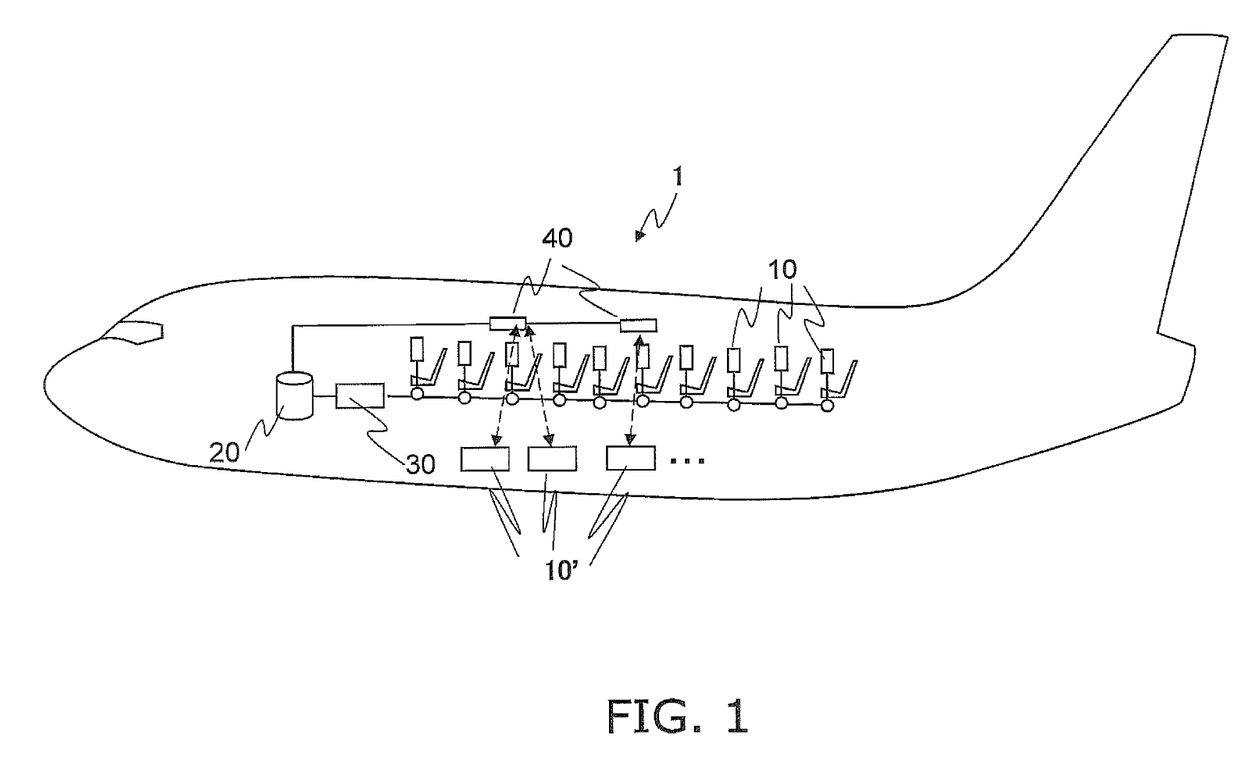
FIG. 1 is a schematic diagram showing the structure of a communication system according to an embodiment.

FIG. 1 schematically shows the overall structure of a communication system 1 (an example of a communication system) according to one embodiment of the present invention. The communication system 1 includes a server device 20 (an example of a communication device), which is mounted on an airplane for storing and distributing audio visual (AV) content, a distributor 30, which is connected to the server device 20 via a cable, and a seat terminal 10 (an example of a communication device), which is connected to the distributor 30 via a cable and installed on or near each seat.

In the communication system 1, content (including movies, television programs, and music) stored in the server device 20 is distributed to a seat terminal 10 located for a passenger in response to a request from the passenger, allowing the passenger to view the content. When the content that is being viewed or the content that the passenger intends to view is predicted not to be replayed completely before the content distribution ends, the seat terminal 10 displays a warning message on its screen indicating that the content that the viewer or the passenger is viewing may not be viewable to the end.

The content may be transmitted to a wireless terminal device 10' (an example of a communication device) instead of being transmitted to the seat terminal 10. This modification will be described later.

The structure of each device included in the communication system 1 will now be described with reference to FIG. 2.

1-1-1. Structure of Seat Terminal

Figure 2:
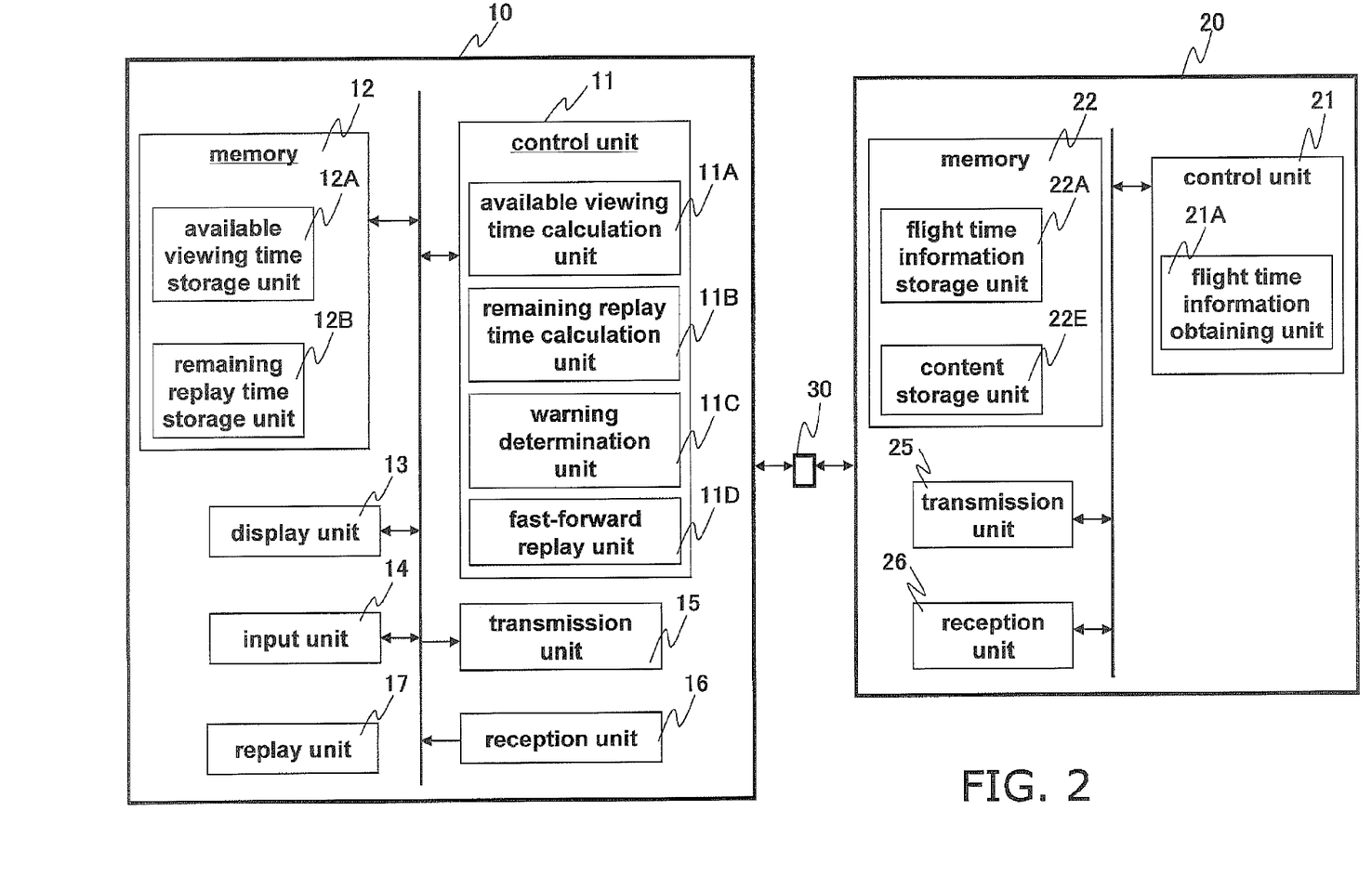
FIG. 2 is a schematic diagram showing the structure of each device included in the communication system according to the embodiment.

FIG. 2 shows an example structure of the seat terminal 10. The seat terminal 10 replays, or displays content distributed from the server device 20. The content includes movies, news programs, music, etc. Such content is typically compressed with a compression technique. For example, audio data is compressed by MP3 or AAC, whereas video data is compressed by MPEG2 or H.264. Audio data or video data is replayed after the data that can be synchronized by using information such as presentation time stamp (PTS) is decompressed. The seat terminal 10 includes a control unit 11, a memory 12, a display unit 13 (an example of an output unit), an input unit 14, a transmission unit 15, a reception unit 16, and a replay unit 17, which achieve the functions of the seat terminal 10.

The control unit 11 includes a central processing unit (CPU), and programs and the like that define the operation of the CPU. The control unit 11 executes a predetermined program to implement the functions of the seat terminal 10. The control unit 11 includes an available viewing time calculation unit 11A, which calculates the time for which the viewer is allowed to view content on the airplane, a remaining replay time calculation unit 11B, which calculates the time needed to completely replay the content at a normal speed, a warning determination unit 11C, which shows a message to the viewer indicating that the available viewing time is shorter than the remaining replay time, and a fast-forward replay unit 11D, which replays the content in a shorter replay time.

The available viewing time calculation unit 11A calculates the available viewing time by using information about the flight time (an example of travel information for transportation) obtained from, for example, the server device 20. The available viewing time is a period of time from the present time to the time at which the content distribution service ends. The time at which the content distribution service ends may be, for example, the time at which the airplane enters preparations for landing and the use of electronic devices including the server device 20 is limited. The time is predictable based on the flight plan or based on information about the position of the airplane determined by the global positioning system (GPS), although the time can change due to airflow conditions, etc. Alternatively, the device may be operated by a flight attendant to start calculating the available viewing time when the remaining available viewing time decreases to one hour.

The remaining replay time calculation unit 11B calculates the remaining replay time needed to completely replay the content being viewed or the content to be replayed. The time needed to replay the entire content is typically defined by a table, such as a table of contents (TOC). For the content that has yet to be replayed, the remaining replay time is the time needed to replay the entire content. For the content that is being viewed, the remaining replay time can be calculated by subtracting the elapsed time from the start of the content up to the present from the time needed to replay the entire content.

The warning determination unit 11C determines whether the content to be viewed or the content being viewed is viewable to the end at the currently set replay speed, and may output warning information based on the determination. More specifically, the warning determination unit 11C compares the remaining replay time with the available viewing time. When the remaining replay time exceeds the available viewing time, the warning determination unit 11C generates warning information indicating that the content may not be viewable to the end. The warning information is then displayed by the display unit 13. Because the available viewing time and the remaining replay time change, this comparison is performed at appropriate timing (e.g., at every predetermined time). The warning determination unit 11C changes the scale of the warning display in accordance with the difference between the available viewing time and the remaining replay time. When the difference becomes zero, or in other words, when the content being viewed is predicted to be viewable to the end at the normal replay speed, the warning determination unit 11C stops the warning display.

The fast-forward replay unit 11D determines to perform fast-forward replay of the content in response to a request from the seat terminal 10 (e.g., selection of a fast-forward replay mode by a viewer). At least one level of speed is set for the fast-forward replay. Each level of the fast-forward replay speed is faster than the normal replay speed, and is set to a speed slow enough to allow the video and audio to be viewable without difficulties (e.g., 1.3 times faster than normal).

The memory 12 stores programs for controlling the seat terminal 10 and various data including all or part of content transmitted from the server device 20. In particular, the available viewing time storage unit 12A stores and updates the available viewing time calculated by the available viewing time calculation unit 11A. The remaining replay time storage unit 12B stores and updates the remaining replay time obtained by the remaining replay time calculation unit 11B.

The display unit 13 includes a display screen, which may for example be a liquid crystal display (LCD) or an organic electroluminescence (EL) display. The display unit 13 is installed on, for example, the rear part of the front seat such that the display is easy to view by the seated passenger or viewer. The input unit 14 is operated to display information (e.g., content) obtained from the server device 20 in accordance with a command from the control unit 11.

The input unit 14 may be, for example, a touch panel displayed on the display unit 13, or a remote controller with operation buttons. The input unit 14 transmits information input by the user operation to the control unit 11. The transmission unit 15 transmits a request signal or other data to the server device 20 via the distributor 30. The reception unit 16 receives content or other information from the server device 20 via the distributor 30.

The replay unit 17 replays content in the display unit 13 at the set replay speed.

1-1-2. Structure of Server Device

FIG. 2 also shows an example structure of the server device 20. The server device 20 is a computer mounted on the airplane. The server device 20 transmits content to the seat terminal 10 used by the viewer or the passenger in response to a viewer request (on demand). The server device 20 also obtains flight information of the airplane, information about the surrounding environment, and other such information.

The server device 20 includes a control unit 21, a memory 22, a transmission unit 25, and a reception unit 26, which are connected via a predetermined bus.

The control unit 21 includes a CPU. The control unit 21 executes a predetermined program to implement the functions of the server device 20. In particular, a flight time information obtaining unit 21A obtains information about the flight time based on data obtained from an airplane operation control system using, for example, the flight plan or the GPS. The flight time changes due to weather and other conditions. The server device 20 thus constantly obtains the flight time information. The server device 20 transmits the flight time information to the seat terminal 10 at every update of the flight time or at every predetermined time.

The memory 22 may be a semiconductor memory or a nonvolatile memory such as a flash memory or a hard disk drive (HDD), or a combination of these. The memory 22 stores software and various data used by the server device 20. In particular, the memory 22 includes a flight time information storage unit 22A and a content storage unit 22E. The flight time information storage unit 22A stores and updates flight time information obtained by the flight time information obtaining unit 21A. The content storage unit 22E stores various pieces of content for distribution.

The transmission unit 25 transmits information (content, flight time information, and other information) read from the memory 22 by the control unit 21 to the seat terminal 10 via the distributor 30. The reception unit 26 receives request signals or other data from the seat terminal 10 via the distributor 30. The transmission unit 25 and the reception unit 26 are each typically formed by a single circuit, but the invention should not be limited to the transmission unit 25 and the reception unit 26 formed by a single circuit.

1-2. Operation of Communication System

Figure 3:
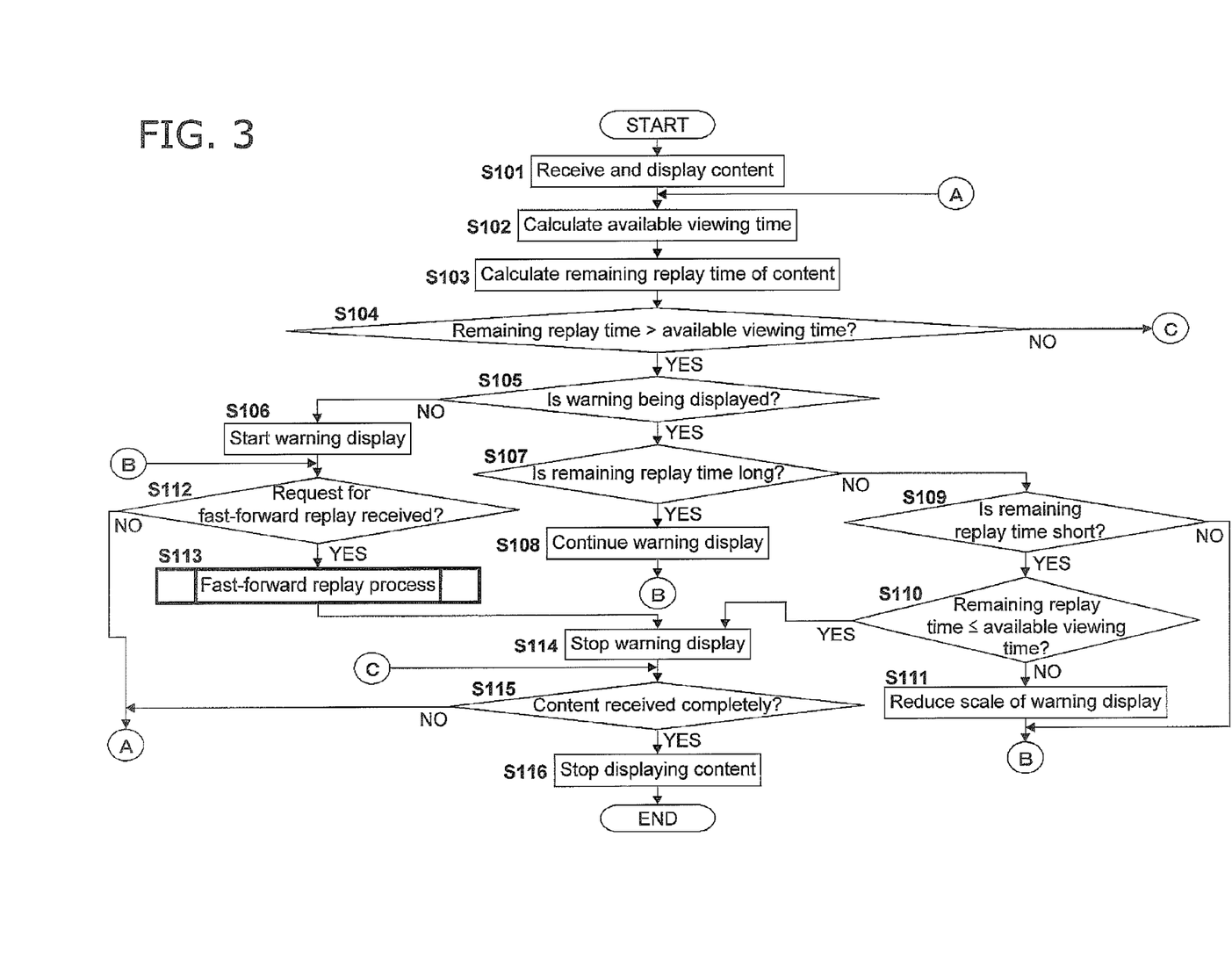
FIG. 3 is a flowchart illustrating the operation of the communication system according to the embodiment.
Figure 4:
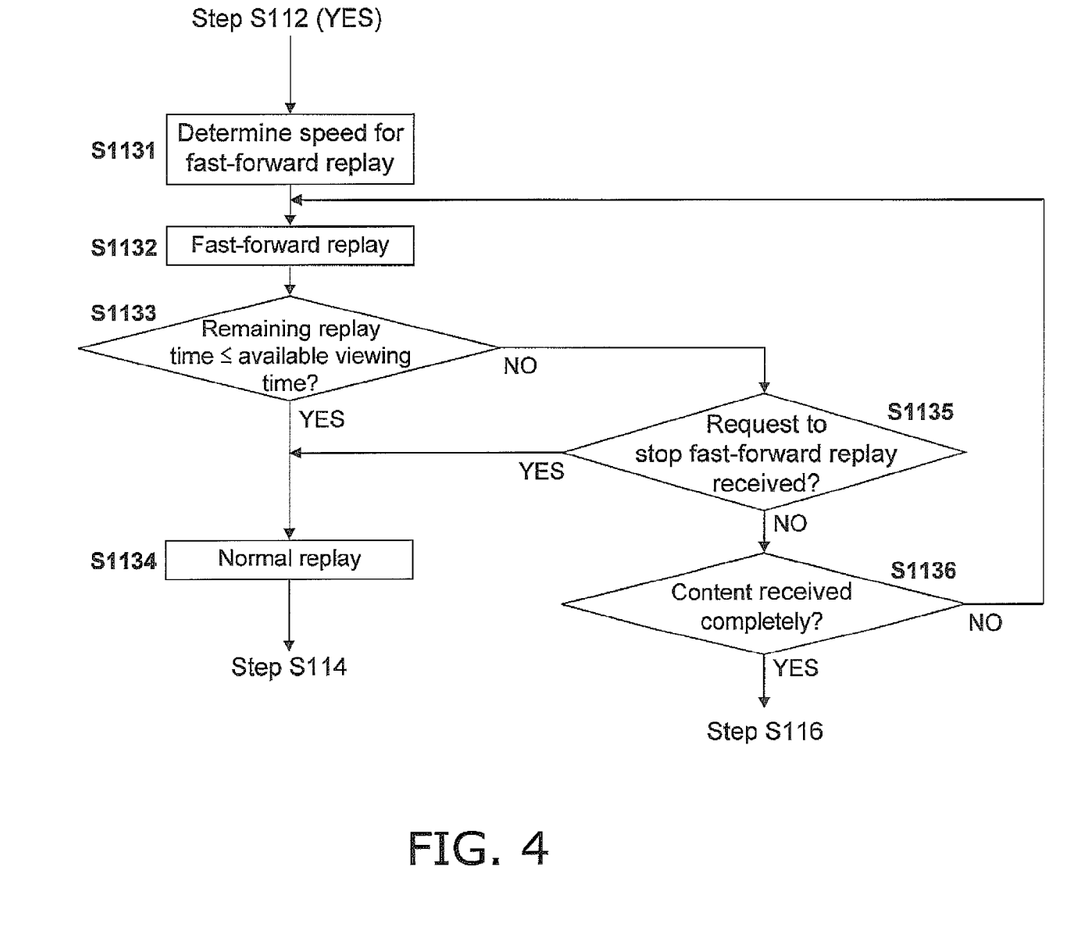
FIG. 4 is a flowchart illustrating a fast-forward replay process according to the embodiment.

Referring now to FIGS. 3 and 4, the operation of the communication system 1 according to the embodiment will now be described focusing on the operation of the seat terminal 10.

Step S101: When the airplane reaches a predetermined altitude and achieves stability after takeoff, the server device 20 enables service on the airplane. Once the service is enabled, a predetermined piece of content is distributed from the server device 20 in accordance with a request from a viewer or a passenger operating the seat terminal 10. The seat terminal 10 receives the distributed content, decompresses the compressed content, and outputs the content, which is then displayed by the display unit 13. Audio data is also decompressed, and output from earphones or a speaker (not shown).

The display unit 13 may display a list of pieces of content on the menu to allow the viewer to select from these pieces of content. This menu display may additionally include the replay time for each piece of content.

Step S102: The available viewing time calculation unit 11A calculates the available viewing time by using the flight time information obtained from the server device 20. The available viewing time may be calculated in the seat terminal 10 based on the information transmitted from the server device 20 as described above. Alternatively, the available viewing time may be calculated in the server device 20, and the resulting information may be transmitted to the seat terminal 10 in real time.

Step S103: The remaining replay time calculation unit 11B calculates the remaining replay time based on the content being viewed or the content to be replayed. More specifically, the remaining replay time calculation unit 11B calculates the remaining replay time by subtracting, from the replay time of the entire content, the elapsed time from the start time of the content up to the currently replayed position at the normal replay speed.

Step S104: The warning determination unit 11C compares the remaining replay time with the available viewing time, and determines whether the remaining replay time exceeds the available viewing time. When the remaining replay time is longer than the available viewing time, the processing proceeds to step S105.

Step S105: The warning determination unit 11C determines whether a warning message has been displayed. When a warning message has been displayed, the processing proceeds to step S107.

Figure 5:
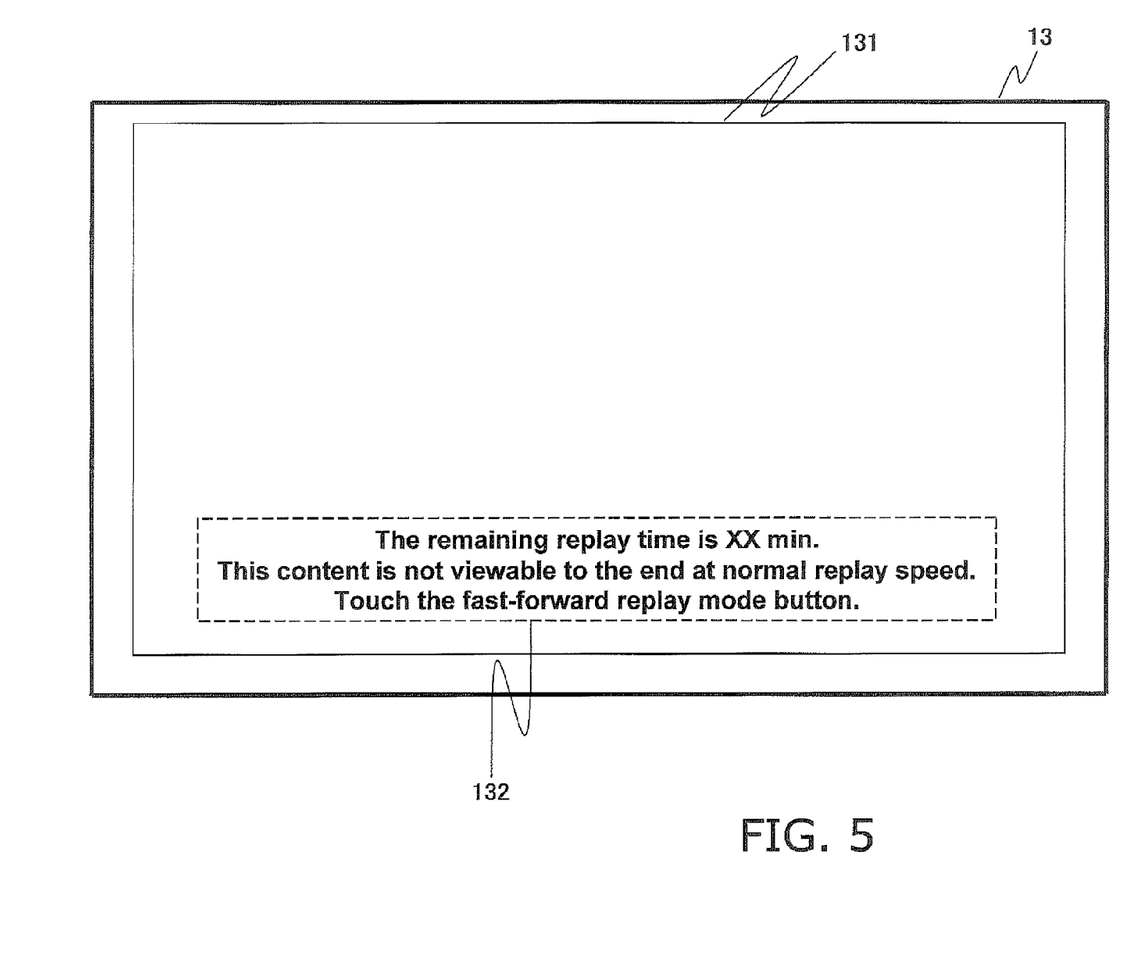
FIG. 5 shows an example of a display on a seat terminal according to the embodiment.

Step S106: When no warning message has been displayed, the warning determination unit 11C starts displaying a warning message. As shown in FIG. 5, for example, the screen of the display unit 13 may include a content display area 131 and a predetermined warning display area 132. A message or the like may appear in the warning display area 132 to warn the viewer. This warning display may be in any scale that is easily recognized by the viewer. The warning display may be superimposed on the content displayed and appears by popping up. The pop-up display may be semi-transparent to allow the video image to be seen through the warning message.

Step S107: When a warning message has been displayed, the warning determination unit 11C determines whether the remaining replay time is longer than a predetermined time (e.g., more than one hour).

Step S108: When the remaining replay time is longer than the predetermined time, the display unit 13 continues displaying the warning message. The processing proceeds to step S112.

Additionally, the display of the warning message may be scaled up and maintained for another predetermined time to warn the viewer again.

Step S109: The warning determination unit 11C determines whether the remaining replay time is shorter than the predetermined time (e.g., equal to or less than 15 minutes).

Step S110: When the remaining replay time becomes short, the warning determination unit 11C determines whether the remaining replay time is equal to or less than the available viewing time. When the remaining replay time is equal to or less than the available viewing time, the processing proceeds to step S114, to stop the warning display.

Although the display may be changed in accordance with the degree of shortage of the available viewing time in steps S107 to S110 as described above, the shortage of the time may be displayed quantitatively on the bar, and the length of the bar may be changed in accordance with the degree of shortage of the time. For example, the bar may appear shorter as the difference between the remaining available viewing time and the remaining time of the content is smaller. This enables the viewer to recognize the shortage of the available viewing time quantitatively.

Step S111: When the warning determination unit 11C determines that the remaining replay time is short in step S109 and the remaining replay time is longer than the available viewing time in step S110, the warning determination unit 11C reduces the scale of the warning display performed by the display unit 13.

The warning determination unit 11C may stop displaying the warning message when the remaining replay time of the content becomes short.

Step S112: The fast-forward replay unit 11D determines whether a request for fast-forward replay has been received. This request is received when the fast-forward replay mode is selected by an operation performed by the viewer. The operation performed by the viewer may be, for example, touching a fast forward button on the screen, or for example on a touch panel incorporated in the input unit 14, or operating a fast forward button on the input unit 14 if the input unit 14 is a remote controller.

Step S113: When a request for fast-forward replay is received in step S112, the fast-forward replay process is performed in step S113. This process will be described later.

Step S114: When the remaining replay time of the content decreases below the available viewing time after the fast forward replay, the warning determination unit 11C stops displaying the warning message.

Steps S115 to S116: The control unit 11 stops displaying the content when completely receiving the content.

Fast-Forward Replay Process

The fast-forward replay process (step S113 in FIG. 3) performed by the seat terminal 10 will now be described with reference to FIG. 4.

Step S1131: The fast-forward replay unit 11D determines the speed for the fast-forward replay. One or more levels are set for the fast-forward replay speed. Commonly, video, such as a movie, expresses motions by reproducing 24 images, called frames, per second. The display device is capable of displaying 50 or 60 images per second, and repeatedly displays 24 images to achieve display of 60 times per second. For example, when the display device repeatedly displays fewer images and displays each of the 24 frames twice, the images are displayed in a time shorter than a second (48/60 seconds). This is fast-forward replay. The audio data is divided in short time blocks and is converted into frequency components in units of blocks to code the audio data. During the replay, some blocks may be excluded from decryption. For example, only three of the four sequential blocks may be decrypted. In this case, the data is replayed at a 33% higher speed. Excluding too many blocks would cause the audio to be replayed discontinuously, and disables natural replay of the audio. To prevent this, the levels of replay speed are set such that video or audio replayed will be viewable and listened to without difficulties (set, for example, to 1.3 times faster than normal). When the video or audio is replayed faster (in a shorter time), only the video may be displayed to prevent unnatural replay of audio.

Before fast-forward replay is performed, the fast-forward replay unit 11D may determine whether fast-forward replay will enable the content to be viewable to the end. In this case, if it is determined that normal speed replay cannot allow the content at or subsequent to the currently viewed position to be viewable to the end, a message indicating that the content is not viewable to the end may appear on the screen of the display unit 13.

Step S1132: The replay unit 17 replays the content at the replay speed determined in S1131.

Step S1133: The fast-forward replay unit 11D determines whether the remaining replay time decreases to or below the available viewing time.

Step S1134: When determining that the remaining replay time decreases to or below the available viewing time, the fast-forward replay unit 11D resets the replay speed to the normal replay speed, and proceeds to step S114 to stop displaying the warning message.

Step S1135: In response to a request to stop the fast-forward replay given by an operation of the viewer (a request to stop the fast-forward replay mode) when the remaining replay time exceeds the available viewing time, the fast-forward replay unit 11D proceeds to step S1134 to reset the replay speed to the normal replay speed.

Step S1136: When the content is received completely, the processing proceeds to step S116 in FIG. 3.

1-3. Advantageous Effects

The seat terminal 10 or the communication system 1 of the above embodiment allows a viewer, who is a passenger, to determine in real time whether the content is viewable to the end during on-board of the airplane. This allows the viewer to easily determine whether to continue viewing the content.

The viewer can select the fast-forward replay mode while viewing the display screen of the content. This allows the viewer to completely view the content, which would not be viewable to the end at the normal replay speed. The viewer can also replay parts of the content important to the viewer at the normal replay speed and may view parts of the content less important to the viewer by fast forward replay or may skip such less important parts. This allows the viewer to view the information content to the end.

Other Embodiments

Although the embodiment of the present invention has been described based on the drawings, the specific structures of the invention should not be limited to those described in the above embodiment. The present invention may be changed and modified variously without departing from the spirit or scope of the invention. For example, the present invention may be modified in the following forms.

(1) Although the above embodiment describes the case in which the available viewing time is calculated during replay of the content at appropriate timing (e.g., at every predetermined time) and the output of the warning information is changed accordingly, the invention should not be limited to this structure.

Figure 6:
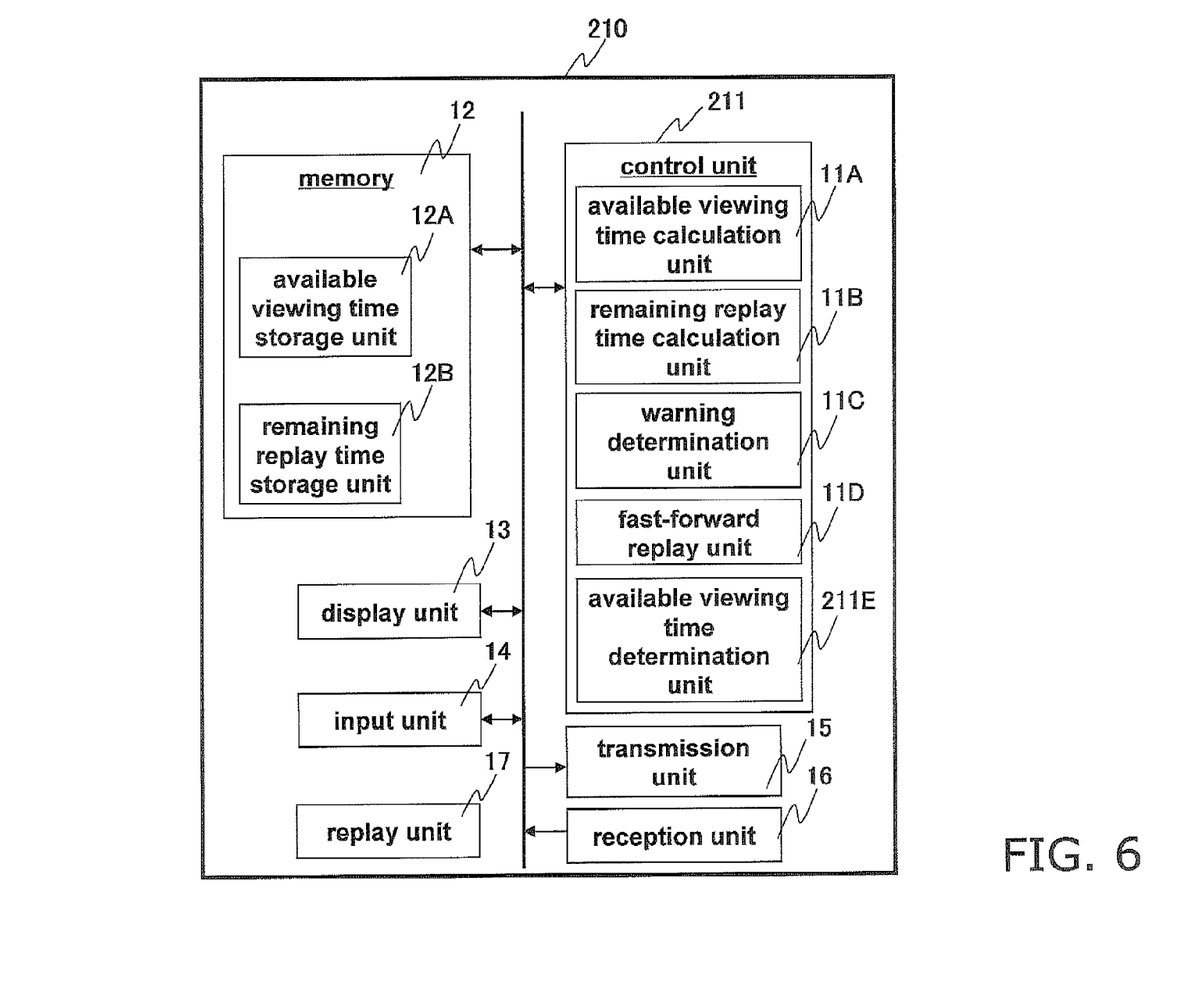
FIG. 6 is a schematic diagram showing the structure of a seat terminal according to another embodiment.

FIG. 6 shows an example structure of the seat terminal 210, which differs from the seat terminal in the above embodiment in that a control unit 211 includes an available viewing time determination unit 211E. The other components of this modification are the same as in the above embodiment and are given the same numerals as those components, and will not be described.

The available viewing time determination unit 211E determines whether the available viewing time has changed based on flight information obtained from the server device 20 (FIG. 2). More specifically, when the available viewing time determination unit 211E determines that the available viewing time has changed based on the flight information, the warning determination unit 11C compares the remaining replay time and the available viewing time based on the determination, and may output warning information based on the difference between the remaining replay time and the available viewing time. For example, the warning determination unit 11C may change the scale of the warning display in accordance with the difference between the available viewing time and the remaining replay time as in the above embodiment, or may stop displaying the warning display when determining that the difference becomes zero, or specifically when the content being viewed is predicted to be viewable to the end at the normal replay speed.

(2) Although the above embodiment describes the case in which the seat terminal 10 calculates the available viewing time and the remaining replay time, determines whether a warning message is to be displayed, and determines whether to perform fast-forward replay, the server device 20 (an example of a communication device) may have these functions. In this case, the seat terminal 10 may display warning in response to a command from the server device 20. When receiving a request for fast-forward replay from the seat terminal 10 (selection of the fast-forward replay mode by an input operation performed by the viewer), the server device 20 determines the speed for the fast-forward replay or determines switching to the normal replay speed, and transmits a command to the seat terminal 10.

(3) In the above embodiment, a wireless terminal 10', which is connected wirelessly, may be used instead of the seat terminal 10. In this case, as shown in FIG. 1, the wireless terminal 10' wirelessly connects to an access point 40 installed on the airplane to achieve the same functions as the seat terminal 10.

(4) In the above embodiment, the fast-forward replay process may include skipping chapters of the content. In this case, the display unit may display chapters of the content and details of the chapters. Chapters unneeded by the viewer may be skipped to decrease the remaining replay time and allow the content to be replayed in a shorter time.

(5) In the above embodiment, when the warning message is displayed continuously for a predetermined time or longer, the scale of the warning message may be reduced to prevent the warning message from disturbing the view. Alternatively, when the warning message is displayed continuously for a predetermined time or longer, the scale of the warning message may be reduced gradually with time. The warning message may be displayed in a small area at, for example, a right corner of the screen, or the scale of the warning message may be reduced in stages. The warning message is displayed typically in English, but is more preferably displayed in a language selected in accordance with a language preselected by the viewer.

When the warning message is displayed continuously for a predetermined time or longer, the warning message may be deleted temporarily.

(6) The warning should not be limited to the display on the screen, but may be audio or the like output via a predetermined audio output unit (an example of an output unit).

The warning message should not be limited to text, an image, or audio, but may directly be the remaining time of the actual available viewing time.

(7) Although the above embodiment is applied to the system used for an airplane, the embodiment is applicable to any system installed in a predetermined space storing content to be viewed in the predetermined space within a limited period of time, for which the available viewing time of the content can be determined. For example, the embodiment may be applicable to a system used for a train, such as a bullet train (the available viewing time of content for a passenger is set by, for example, specifying a destination station in advance), a conference room, or a hall.

(8) The order in which the processes are implemented in the above embodiment should not be limited to the order specified in the above embodiment, but may be changed without departing from the spirit or scope of the invention.

What is claimed:

1. A communication device installed in a predetermined space and operable to receive content distributed only within an available viewing time, the available viewing time being variable, and display the content, the communication device comprising:
    an available viewing time calculation unit configured to calculate the available viewing time;
    a replay time calculation unit configured to calculate a replay time needed to replay predetermined content;
    a warning determination unit configured to compare the replay time and the available viewing time and configured to generate warning information when the replay time exceeds the available viewing time;
    an output unit configured to output the warning information generated by the warning determination unit; and
    wherein
    the available viewing time varies according to a travel information for a transportation means on which a viewer of the predetermined content is boarding.

2. The communication device according to claim 1, wherein the available viewing time is variable according to a condition during a replay of the predetermined content.

3. The communication device according to claim 2, wherein the warning determination unit is configured to compare the replay time and the available viewing time at predetermined timing during the replay of the predetermined content and configured to change a manner in which the warning information is outputted or stop an output of the warning information when the available viewing time has changed.

4. The communication device according to claim 2, further comprising an available viewing time determination unit configured to determine that the available viewing time has changed according to the condition, wherein
    the warning determination unit is configured to change the manner in which the warning information is outputted or stop the output of the warning information according to the determination of the available viewing time determination unit.

5. The communication device according to claim 1, wherein:
    the output unit includes a display unit configured to display the warning information;
    the warning determination unit is configured to compare the replay time and the available viewing time during a replay of the predetermined content; and
    the warning determination unit is further configured to change a scale of the warning information displayed by the display unit when the warning determination unit has determined that a difference between the replay time and the available viewing time is changed.

6. The communication device according to claim 5, wherein the warning determination unit is configured to reduce the scale of the warning information displayed by the display unit when the warning determination unit has determined that the difference between the replay time and the available viewing time is smaller.

7. The communication device according to claim 5, wherein the warning determination unit is configured to discontinue a display of the warning information by the display unit when the warning determination unit has determined that the difference between the replay time and the available viewing time is smaller.

8. The communication device according to claim 5, wherein the warning determination unit is configured to discontinue a display of the warning information by the display unit when the warning determination unit has determined that the warning information has been displayed continuously for a predetermined time or longer.

9. The communication device according to claim 5, wherein the warning determination unit is configured to gradually reduce the scale of the warning information displayed by the display unit as a time for which the warning information has been displayed by the display unit is longer.

10. A communication device installed in a predetermined space and operable to receive content distributed only within an available viewing time, the available viewing time being variable, and display the content, the communication device comprising:
- an available viewing time calculation unit configured to calculate the available viewing time;
- a replay time calculation unit configured to calculate a replay time needed to replay predetermined content;
- a warning determination unit configured to compare the replay time and the available viewing time and configured to generate warning information when the replay time exceeds the available viewing time;
- an output unit configured to output the warning information generated by the warning determination unit;
- a replay unit configured to replay the predetermined content at a predetermined replay speed; and
- a fast-forward replay unit configured to fast-forward a replay of the predetermined content performed by the replay unit,
- wherein when the warning determination unit has determined that the replay time exceeds the available viewing time, the fast-forward replay unit fast-forwards the replay of the predetermined content, and
- when the warning determination unit has determined that the replay time is decreased to or below the available viewing time after the fast forward replay unit has fast-forwarded the replay of the predetermined content, the warning determination unit discontinues the warning information outputted by the output unit.

11. A communication device installed in a predetermined space and operable to receive content distributed only within an available viewing time, the available viewing time being variable, and display the content, the communication device comprising:
- an available viewing time calculation unit configured to calculate the available viewing time;
- a replay time calculation unit configured to calculate a replay time needed to replay predetermined content;
- a warning determination unit configured to compare the replay time and the available viewing time and configured to generate warning information when the replay time exceeds the available viewing time;
- an output unit configured to output the warning information generated by the warning determination unit;
- a replay unit configured to replay the predetermined content at a predetermined replay speed; and
- a fast-forward replay unit configured to fast-forward a replay of the predetermined content performed by the replay unit by changing a replay speed of the replay unit from the predetermined replay speed to a higher replay speed,
- wherein when the warning determination unit has determined that the replay time is decreased to or below the available viewing time after the fast forward replay unit has fast-forwarded the replay of the predetermined content, the fast-forward replay unit changes the replay speed of the replay unit from the higher replay speed back to the predetermined replay speed.

12. A communication system comprising:
- a first communication device, the first communication device being the communication device according to claim 1; and
- a second communication device configured to distribute the predetermined content to the first communication device.

13. A communication device installed in a predetermined space and operable to distribute content to one other communication device only within a variable available viewing time, the communication device comprising:
- an available viewing time calculation unit configured to calculate the variable available viewing time;
- a replay time calculation unit configured to calculate a replay time needed to replay predetermined content;
- a warning determination unit configured to compare the replay time and the variable available viewing time and configured to generate warning information when the replay time exceeds the available viewing time, the generated warning information being outputted to and displayed by the one other communication device; and wherein
- the variable available viewing time varies according to a travel information for a transportation means on which a viewer of the predetermined content is boarding.

* * * * *